March 23, 1943.   C. C. MEUTSCH   2,314,361
SPRING SUSPENSION FOR FURNITURE
Filed Jan. 15, 1941   2 Sheets-Sheet 1

INVENTOR
Charles C. Meutsch
BY Popp & Popp
ATTORNEYS.

March 23, 1943.  C C. MEUTSCH  2,314,361
SPRING SUSPENSION FOR FURNITURE
Filed Jan. 15, 1941   2 Sheets-Sheet 2
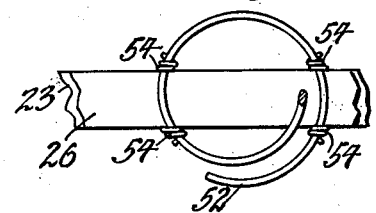
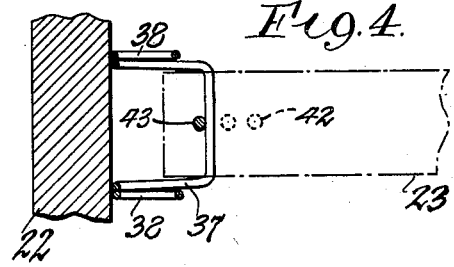
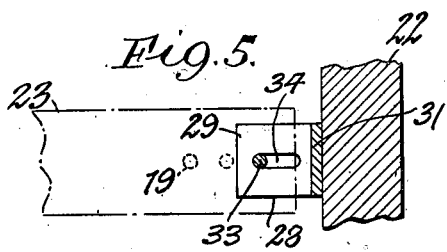
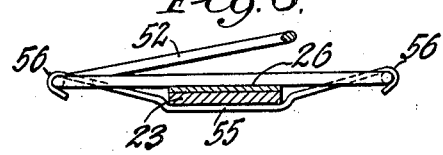
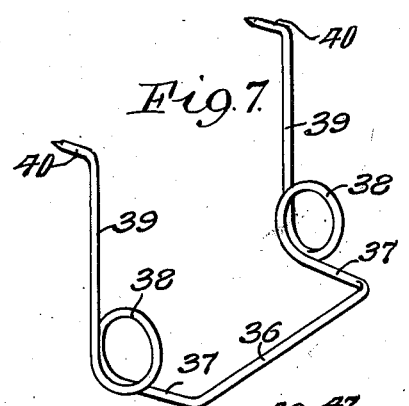
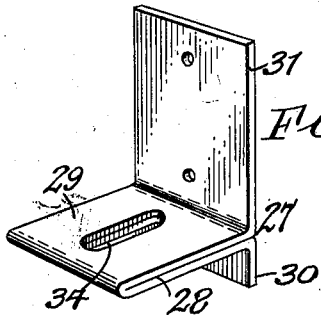
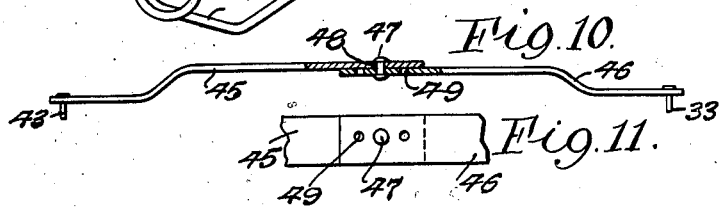
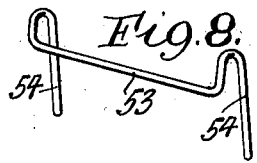
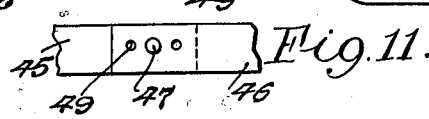
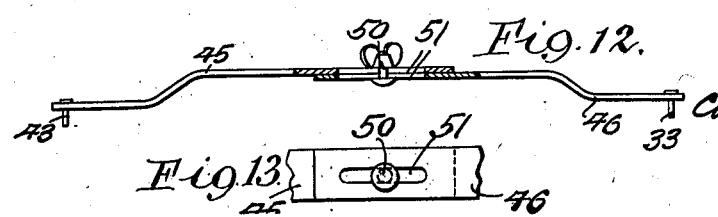
INVENTOR
Charles C. Meutsch
BY
ATTORNEYS.

Patented Mar. 23, 1943

2,314,361

UNITED STATES PATENT OFFICE 2,314,361

SPRING SUSPENSION FOR FURNITURE

Charles C. Meutsch, Buffalo, N. Y.

Application January 15, 1941, Serial No. 374,501

2 Claims. (Cl. 155—179)

This invention relates to a spring suspension for use in furniture such as chairs, sofas, davenports and the like, and has for its objects the provision of a suspension of this character which is strong and durable, low in cost of manufacture, capable of being readily and easily installed and noiseless in action when the furniture is used.

In the accompanying drawings:

Figs. 3, 4 and 5 are fragmentary horizontal sections, on an enlarged scale, taken respectively on the correspondingly numbered lines in Fig. 2.

Fig. 6 is a perspective view of one of the rigid hangers for supporting one end of a spring supporting bar on the main frame of a piece of furniture.

Fig. 7 is a similar view of one of the yielding hangers for supporting one end of a spring supporting bar on the furniture frame.

Fig. 8 is a similar view of one of the clips for fastening a helical spring on a supporting bar in accordance with this invention.

Fig. 9 is a fragmentary cross section showing means for fastening a helical spring on a supporting bar which embody this invention but differ in detail from those shown in Figs. 1-3 and 8.

Fig. 10 is a side view, partly in section, of a modified form of supporting bar for use in this spring suspension.

Fig. 11 is a plan view of the central part of the same.

Fig. 12 is a side view of another modification, partly in section, of a supporting bar embodying this invention.

Fig. 13 is a plan view of the central part of the same.

In the following description similar characters of reference indicate like parts in the several figures of the drawings.

Figure 1:
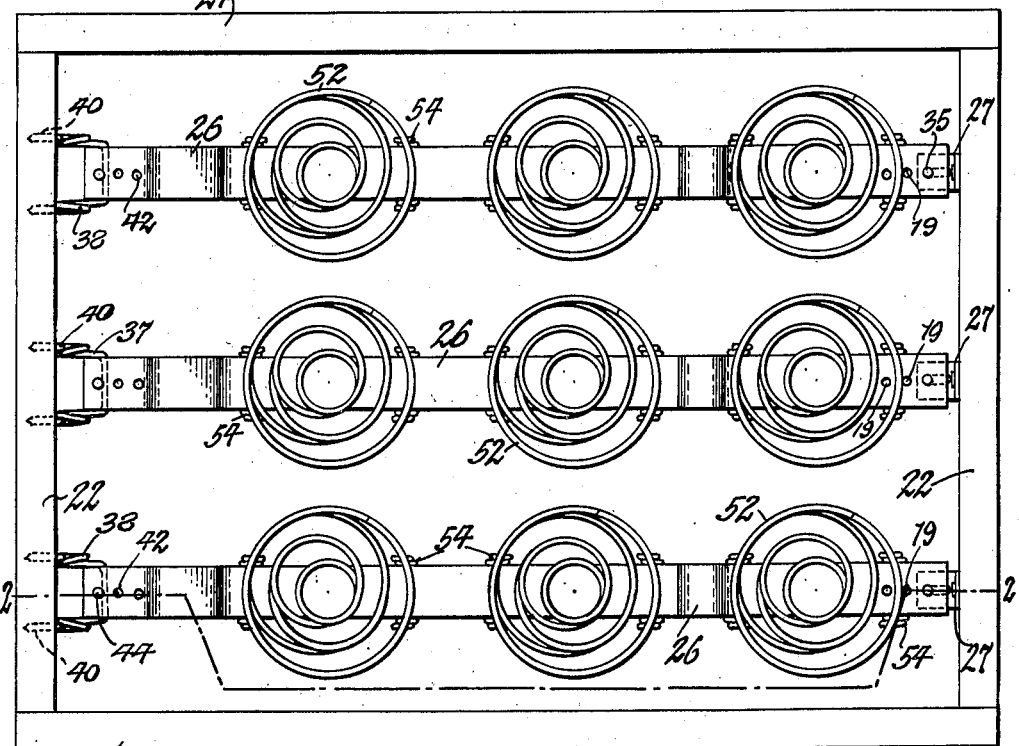
Fig. 1 is a top plan view of a spring suspension constructed in accordance with this invention and embodied in the frame of a chair.

Although the spring suspension forming the subject of this invention may be embodied in furniture of different character and for various purposes the same is shown in the drawings as an example of one practical application in connection with the frame of a chair having front and rear longitudinal rails 20, 21 and transverse side rails 22 connecting the corresponding ends of the longitudinal rails, these several rails being made of wood or other suitable material.

Figure 2:
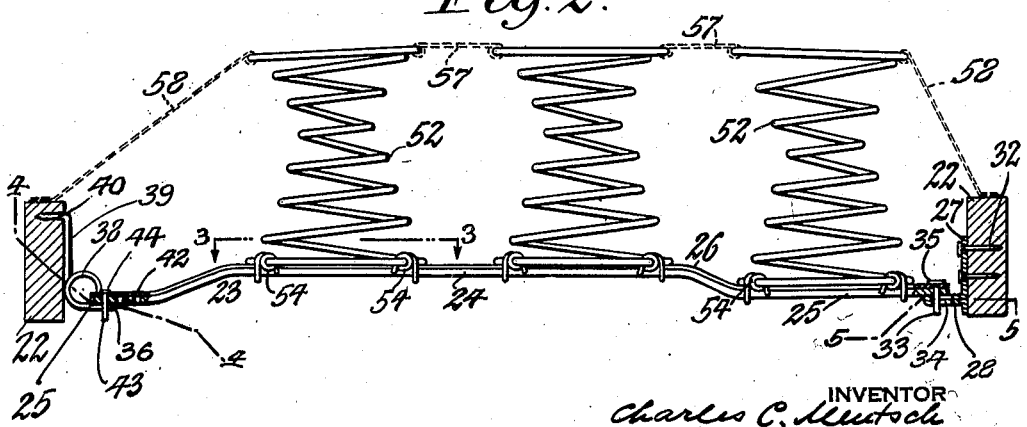
Fig. 2 is a vertical longitudinal section of the same taken on line 2—2, Fig. 1.

Within the lower part of the space enclosed by the frame is arranged the bottom or base of the spring suspension which, in the form shown in Figs. 1 and 2, includes a plurality of longitudinal bars 23 of spring metal, such as steel, which are spaced apart transversely of the frame and each of which is preferably bent so as to provide an elevated central part 24 and depressed parts 25 at opposite ends of this bar and therefore present the general appearance of an upwardly deflected arch, as shown in Fig. 2. On its upper side each of these bars is provided with a covering of sound deadening or absorbing material 26, such as a strip of paper, for the purpose of preventing noise when moving the supporting bar and any parts mounted thereon.

In the construction shown in Figs. 1 and 2 each of these supporting bars is made in one piece and mounted at one end by non-resilient means on one side of the frame and mounted at its opposite end by resilient means on the other side of the frame. These mounting means may be variously constructed but the non-resilient means for this purpose shown in Figs. 1, 2, 5 and 6 are constructed as follows:

The numeral 27 represents a hanger or bracket constructed from a strip of metal which is bent to form a central horizontal fold 28 the two plies of which have their inner ends connected and the upper ply thereof forming an upwardly facing shoulder 29, and lower and upper vertical flanges 30, 31 projecting downwardly and upwardly respectively from the outer ends of said plies, as shown in Figs. 2 and 6. These flanges of the non-resilient hanger engage with the inner side of one of the transverse frame bars and the upper one 31 of these bars is secured to the respective frame bar by means of nails 32 as shown in Fig. 2, or by any other suitable means.

One end of one of the supporting bars 24 rests on the shoulder 29 of the non-resilient hanger and is connected therewith so as to be held against lateral displacement thereon but permitted to move lengthwise thereon to a limited extent by means of a vertical guiding and retaining pin 33 passing through one or another of a row of holes 19 in the end of this bar and projecting with its lower part downwardly therefrom through a longitudinal slot 34 in the fold 28 of the respective hanger and having the head 35 at the upper end of this pin bearing against the upper side of the paper sound absorber on the supporting bar.

As the supporting bar is straightened and unstraightened upon loading and unloading the same that end thereof resting on the shoulder 29 of the non-resilient hanger will be moved lengthwise on the latter but is guided and retained thereon during this action by the pin 33 of the bar moving lengthwise in the slot 34 of the non-resilient hanger.

The resilient hanger whereby the opposite end of the supporting bar is mounted on the opposite side of the frame is shown in Figs. 1, 2, 4 and 7 and is constructed as follows:

The numeral 36 represents a cross rod which is slidingly engaged by the underside of the supporting bar and provided at its opposite ends with outwardly projecting horizontal arms 37. The numeral 38 represents two spring coils each of which has one end connected with the outer end of one of the hanger arms 37 while its opposite end is connected with the lower end of a vertical arm 39. The latter engages the inner side of the adjacent part of the frame and may be secured thereto by any suitable means, such, for example, as spurs 40 formed on the upper ends of the arms 39 and driven into the adjacent bars 22 of the frame which are usually made of wood, as shown in Figs. 1, 2 and 7.

The adjacent end of the respective supporting bar is provided with a plurality of holes 42 one or the other of which receives a vertical guiding and retaining pin 43 which projects downwardly on the outer side of the hanger rod 36 and is provided at its upper end with a head 44 bearing against the upper side of the sound-absorbing covering on the adjacent part of the respective supporting rod 36.

This resilient hanger provides a cushion support for the adjacent end of the respective supporting bar and cooperates with the other members of the spring suspension to yieldingly support the load which is imposed on the suspension uniformly and reliably and without liability of distorting any of the parts or reducing their efficiency.

By providing the supporting bar 24 with rows of holes 19, 42, in its opposite ends the pins 33, 43 may be engaged with the appropriate hole of each of these rows to suit the distance between the side rails of the respective piece of furniture and if the opening or holes selected are too far inward from the ends of the supporting bar the excess length of the latter may be cut off in order to fit the particular furniture which is to receive this bar.

Instead of making the supporting bars in one piece and cutting off the ends thereof to suit the length of the frame of a particular piece of furniture each of these supporting bars may be adjustably constructed in sections which are adjustably connected so that the length of each bar can be adapted to different requirements. For example, as shown in Figs. 10 and 11, each supporting bar may be constructed of two sections 45, 46 which have their inner ends overlapping one another and adjustably connected by a rivet 47 passing through an opening 48 in one of the bar sections and through one or another of a plurality of openings 49 formed in a longitudinal row in the inner end of the other bar section. By selecting the required opening 49 for the reception of the rivet 47 the length of the supporting bar as a whole may be varied to suit the length of the space which is to be bridged by the respective bar.

Still another way of accomplishing this purpose is shown in Figs. 12–13 in which relative longitudinal adjustment of two sections of a supporting bar may be effected by the use of a clamping bolt 50 passing through slots 51 in the overlapping inner ends of the respective bar sections.

In addition to the resilient supporting bars the spring suspension includes a plurality of upright helical cushioning springs 52 of which a suitable number are mounted in a longitudinal row on each of the supporting bars, three of such springs being shown on each of said bars, for example, in Figs. 1 and 2.

Various means may be employed for connecting the lowermost turn of each of these helical springs with the respective supporting bar on which it rests. The means for this purpose which are shown in Figs. 1, 2 and 8 for accomplishing this purpose in accordance with one feature of the present improvements consists of a wire clip comprising a cross rod 53 engaging transversely with the underside of the supporting bar and provided at its opposite ends with coiled arms 54 which project upwardly along the opposite longitudinal edges of the respective supporting bar and are twisted around diametrically opposite parts of the lowermost turn of the respective helical spring. This clip is originally formed with the attaching arm in the form of loops or hooks as shown in Fig. 8 in which form the same is first assembled with a supporting bar and a helical cushioning spring by engaging the cross rod with the underside of the supporting bar and passing the attaching arms while in the form of loops or hooks over diametrically opposite parts of the lowermost turn of the helical spring after which these arms are twisted around the respective parts of the helical spring as shown in Figs. 1 and 2 and reliably connecting this bar and spring.

Instead of employing the clip shown in Figs. 1, 2 and 8, the supporting bar and cushioning spring may be connected by a clip made of a piece of wire or strip of metal to form a straight central part 55 which engages crosswise with the underside of the supporting bar and two hooks 56 arranged at opposite ends of the central part 55 and projecting upwardly along opposite longitudinal edges of the supporting bar and engaging downwardly over diametrically opposite parts of the lowermost turn of the helical cushioning spring, as shown in Fig. 9.

At their upper ends the helical springs are connected with each other by horizontal intermediate ties or stays 57 and the endmost springs of each row are also connected with the adjacent frame rails by inclined side ties or stays 58, as shown by dotted lines in Fig. 2.

As a whole this spring suspension is very simple in construction and not liable to get out of order and the several parts can be manufactured and assembled at low cost, thereby effecting a substantial economy in the production of spring suspensions for this purpose.

I claim as my invention:

1. A spring suspension for furniture comprising a frame, a resilient supporting bar arranged within the frame, and means for mounting an end of said bar on said frame including a hanger attached to said frame and provided with an upwardly facing shoulder upon which an end of said bar rests and is adapted to slide lengthwise thereon said hanger being produced from a strip of metal the central part of which is bent into a horizontal fold the upper side of which forms said shoulder and vertical flanges which are arranged at the outer ends of the plies of said fold and are secured to said frame, and means for guiding and retaining said bar on said shoulder consisting of a pin arranged on said bar and projecting downwardly into a longitudinal slot formed in the folded portion of said hanger.

2. A spring suspension for furniture comprising a frame, a resilient supporting bar arranged within the frame, and means for resiliently mounting an end of said bar on said frame including a horizontal rod engaging transversely with the underside of said bar, spring means connecting said rod with said frame and a pin projecting downwardly from said bar on the outer side of said rod.

CHARLES C. MEUTSCH.